United States Patent [19]

Boettcher et al.

[11] Patent Number: 4,738,318

[45] Date of Patent: Apr. 19, 1988

[54] ELECTRICAL STRESS CONTROL

[75] Inventors: Bodo Boettcher, Zorneding; Werner Rupprecht, Tuerkenfeld, both of Fed. Rep. of Germany

[73] Assignee: Raychem GmbH, Fed. Rep. of Germany

[21] Appl. No.: 36,126

[22] Filed: Apr. 7, 1987

Related U.S. Application Data

[63] Continuation of Ser. No. 577,104, Feb. 6, 1984, abandoned.

[30] Foreign Application Priority Data

Feb. 8, 1983 [GB] United Kingdom ................. 8303462

[51] Int. Cl.⁴ ................. H02G 15/068; H02G 15/188
[52] U.S. Cl. ................................. 174/73 R; 310/196
[58] Field of Search ................. 174/73 R, 73 SC, 127, 174/142; 310/196

[56] References Cited

U.S. PATENT DOCUMENTS

| | | | |
|---|---|---|---|
| 3,950,604 | 4/1976 | Penneck | 174/73 R X |
| 4,207,364 | 6/1980 | Nyberg | 174/73 R X |
| 4,487,994 | 12/1984 | Bahder | 174/73 R |

FOREIGN PATENT DOCUMENTS

| | | | |
|---|---|---|---|
| 6609658 | 8/1972 | Fed. Rep. of Germany | 174/73 R |
| 54-115703 | 9/1979 | Japan | 310/196 |
| 144279 | 10/1967 | New Zealand . | |
| 1202910 | 8/1970 | United Kingdom | 174/73 R |
| 1213234 | 11/1970 | United Kingdom . | |
| 1219323 | 1/1971 | United Kingdom | 174/73 R |
| 1246829 | 9/1971 | United Kingdom . | |
| 1470501 | 4/1977 | United Kingdom | 174/73 R |
| 1470504 | 4/1977 | United Kingdom | 174/73 R |
| 1473499 | 5/1977 | United Kingdom | 174/73 R |
| 1474167 | 5/1977 | United Kingdom | 174/73 R |
| 1493163 | 11/1977 | United Kingdom | 174/127 |

*Primary Examiner*—Laramie E. Askin
*Attorney, Agent, or Firm*—Edith A. Rice; Herbert G. Burkard

[57] ABSTRACT

An arrangement for and method of limiting the electrical stress in a region of high electric field strength associated with high voltage equipment, especially power cables, employs two overlapping layers of semiconductive material that have different a.c. electrical impedance characteristics to surround the region. The inner layer may be a heat-shrinkable tube having a linear characteristic, and the outer layer may have a non-linear characteristic and be provided as an internal coating on a further heat-shrinkable tube of insulating material. Such an arrangement provides good electrical protection in terms of both a.c. and impulse performance.

20 Claims, 1 Drawing Sheet

U.S. Patent
Apr. 19, 1988
4,738,318
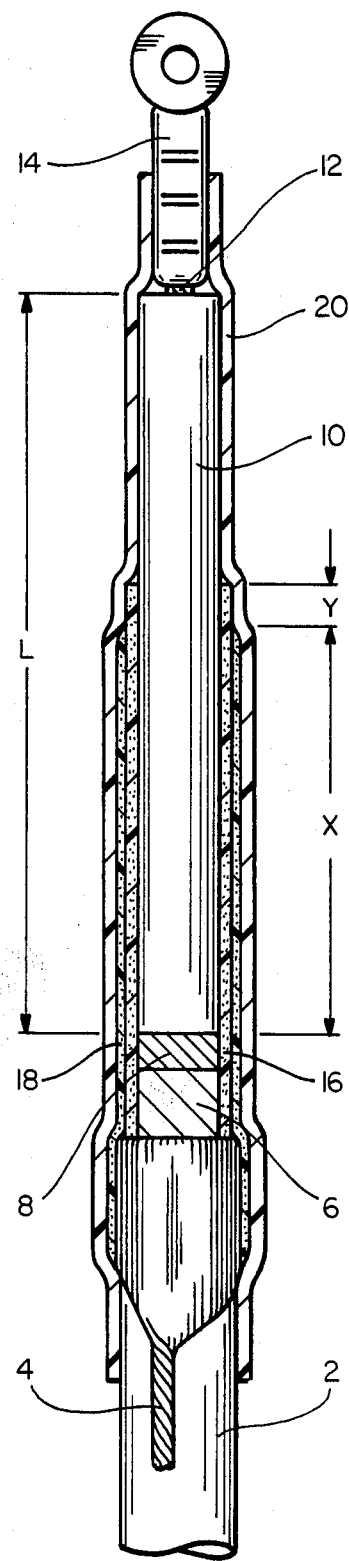

ELECTRICAL STRESS CONTROL

This application is a continuation, of application Ser. No. 577,104, filed Feb. 6, 1984 now abandoned.

DESCRIPTION

This invention relates to electrical stress control, and in particular to an arrangement for and method of limiting the electrical stress in a region of high electric field strength associated with high voltage equipment. The invention finds particular, though not exclusive, application in limiting the electrical stress at a joint or termination of a high voltage cable. However, the invention is also applicable, for example, for effecting stress control at an electrical bushing, or anywhere where a high field arises from a discontinuity in an electric cable, or from other electrical equipment.

The term "high voltage" as used herein is to be understood as referring to voltages in excesss of about 1 kV, and especially in excess of about 10 kV.

Where a continuously screened, or shielded, high voltage cable is terminated, the screen is removed for such a distance that electrical breakdown along the surface of the insulation from the conductor to the screen cannot occur. The removal of the screen causes discontinuity of the electric field so that there is severe electrical stress at the end of the screen. This problem and some solutions thereto are discussed in UK Patent Specification Nos. 1,470,501 to 1,470,504, the entire contents of which specifications are incorporated herein by this reference. It has been found, however, that the stress control provided by these and other known techniques may not be entirely satisfactory in some applications.

It is one object of the present invention to provide an arrangement and a method whereby improved stress control is achieved.

In accordance with one aspect of the present invention, there is provided an arrangement for limiting the electrical stress in a region of high electric field strength associated with high voltage equipment, the arrangement comprising two layers of material that overlap each other and that enclose at least part of said region of the equipment, where each of said layers is electrically semiconductive, and wherein the a.c. electrical impedance characteristics of said layers are different from each other.

In accordance with another aspect of the present invention, there is provided a method of limiting the electrical stress in a region of high electric field strength associated with high voltage equipment, wherein two overlapping layers of material are applied to the equipment so as to enclose at least part of said region of the equipment, wherein each of said layers is electrically semiconductive and wherein the a.c. electrical impedance characteristics of the layers are different from each other.

The a.c. electrical impedance characteristic of a material is the relationship between the a.c. voltage applied to the material and the current consequently flowing therethrough. This can be expressed by the following equation:

$$I = KV^\gamma$$

where
I is the current
V is the applied a.c. voltage
K is a constant
$\gamma$ is a constant $\geq 1$.

For a material that obeys Ohm's Law, $\gamma = 1$ and the impedance characteristic is a straight line, and thus the material is said to be "linear". For other materials, $\gamma > 1$, and the material is said to be "non-linear". It is known that a given material may exhibit linear behaviour over a low field strength range, and non-linear behaviour over a higher field strength range, and thus may require two $\gamma$ values, different from each other but each of which is constant over a given field strength range, fully to define its characteristic. For the purpose of this specification, materials which have different values of $\gamma$ for at least part of their characteristics are considered to have different impedance characteristics. Thus, such materials may each be non-linear, but to different degrees, or alternatively, one material may be linear and another material non-linear.

A linear material is considered herein to be semiconductive if its specific impedance lies within the range from about $10^6$ ohm-cm to about $10^{10}$ ohm-cm, preferably from about $5 \times 10^7$ ohm-cm to about $5 \times 10^9$ ohm-cm, and most preferably from about $10^8$ ohm-cm to $10^9$ ohm-cm. A non-linear material is considered herein to be semi-conductive if its impedance at 1 kV(a.c.)/cm is between about $1 \times 10^7$ ohm-cm and about $1 \times 10^9$ ohm-cm, and preferably is about $1 \times 10^8$ ohm-cm, and at 10 kV(a.c.)/cm is between about $10^4$ ohm-cm and about $10^8$ ohm-cm, and preferably is about $5 \times 10^6$ ohm-cm.

When one of the layers in the arrangement of the invention is linear, the value of $\gamma$ of the non-linear material is preferably $\geq 3.0$ at a field strength in the range from 1 kV(a.c.)/cm to 10 kV(a.c.)/cm. When both layers are non-linear, preferably their $\gamma$ values differ by at least 2.0, at a field strength in the range from 1 kV(a.c.)/cm to 10 kV(a.c.)/cm.

Parameters that are particularly useful for determining the effectiveness of stress control arrangements include the so-called AC behaviour and the so-called impulse behaviour of the equipment to which the arrangement is applied. AC behaviour of a cable termination or joint for example can be determined by a discharge test in which the magnitude of the discharge that occurs is measured at specific applied a.c. voltages and has to be below specific values, and also the voltage at which the discharge extinguishes is measured and has to be above a specific value. The impulse behaviour is determined by an impulse voltage withstand test in which impulses of a specific value and waveform are applied to the cable and have to be withstood without flashover.

Known stress control arrangements for satisfying the above-mentioned requirements in respect of terminating or jointing cables for example, necessitate cutting back the outer layers of the cable around the insulation for an appreciable length, and this can be difficult and is usually time-consuming. Moreover, at voltages in excess of about 20 kV it is necessary to provide additional means for stress control, and this is usually done by changing the physical shape of a cable termination for example by adding a stress cone or one or more sheds. Inevitably, therefore, the diameter of the stress control arrangement is appreciably increased.

The present invention on the other hand allows a tubular member such as a cable to be provided with stress control to meet the required standards but which requires a significantly shorter length of the cable to be cut back, with consequent advantages in time and cost savings.

In a preferred arrangement of the present invention, one of the layers, for example an inner layer, has a linear impedance characteristic, and exhibits good a.c. behaviour, and the other layer, for example an outer layer, has a non-linear impedance characteristic, and exhibits good impulse behaviour. Thus, by such a combination of materials, a particularly convenient stress control arrangement can be obtained that satisfies all the usual electrical requirements.

More preferably, one of the layers has a linear impedance and is, in use, electrically connected to a ground screen of the cable and extends therefrom along the cable insulation towards the cut-back end of said insulation, and the other layer of the arrangement is electrically connected to the cable screen and extends therefrom, overlapping said one layer, towards the cut-back end of the cable insulation for a shorter distance than said one layer.

The layers of the arrangement may conveniently be provided as tubular members, or one may be a coating on the inside of the other or another tubular member, which latter member may be of electrically insulating material. The tubular members may be recoverable, for example heat-recoverable. The layers may be discrete, or they may be integral with each other, for example by being co-extruded.

The two layers may or may not be co-terminous but if adjacent ends of each layer are at the same potential, which may be high voltage or earth potential, then the layer having the linear, or less non-linear, impedance characteristic preferably extends further than the other layer towards a location at an appreciably different potential, for example earth or high voltage respectively.

Although the present invention finds application to high voltage equipment other than cables, it is particularly applicable at a joint or termination of a cable, and also where a cable encounters a bushing.

With reference, by way of example only, to a cable termination, the layers may extend along part or the whole length of the exposed insulation of the cable, and may or may not overlap and be in electrical contact with one or both of the earth screen and conductor of the cable.

It will be appreciated that the distance between the end of the cable screen and the end of the cable insulation, at a cable termination or joint, is governed by the type and voltage rating of the cable. The particular absolute lengths, overlap lengths, and positioning of the layers of the present arrangement are also thus governed, and in addition are to be decided in relation to the linearity or non-linearity of the materials employed. However, since a non-linear material tends to become more conductive at higher electric field strengths, it will be appreciated that the smaller the degree of non-linearity the closer can the layer of such material approach a high potential region when another portion of the layer is close to a low potential region, or vice versa. In this respect, it will be understood that the acceptable leakage current will be an important limiting factor.

With reference to use of the stress control arrangement at a cable joint, it is envisaged that a layer having a linear or only slightly non-linear characteristic may extend across the area where the conductors are connected, and may extend continuously from being in electrical contact with the screen of one cable, to the conductor connector, and into electrical contact with the screen of the other cable.

Furthermore, it is dependent on the differences between the impedance characteristics as to which of the layers is overlapped by the other, for example which is inside the other if the layers are tubular.

Examples of materials suitable separately or in combination for the layers of the arrangement of the invention include: an electrically insulating polymeric material that contains carbon black; a material comprising iron oxide; a material comprising zinc oxide; a material comprising silicon carbide; a polymeric material disclosed in UK Patent Specification Nos. 1,470,504 or 1,470,501.

One of said layers of the arrangement of the invention may comprise iron oxide; or zinc oxide; or silicon carbide; or a polymeric material having dispersed therein at least one particulate filler selected from: compounds having a perovskite type crystal structure; compounds having a spinel crystal structure, other than $\gamma$-$Fe_2O_3$ and spinel itself; compounds having an inverse spinel crystal structure; compounds having a mixed spinel crystal structure; dichalcogenides of transition metals and of tin; AgI, Prussian blue, Rochelle salt and other alkali metal tartrates, compounds of the formula $HX_2YO_4$, wherein X is K, Rb or Cs and Y is P or As, ammonium fluoroberyllate, thiourea, ammonium sulphate and triglycine sulphate; $Si_3N_4$; the total weight of said compound(s) being at least 10% based on the weight of the polymeric material and and the material having a $\gamma$-value of at least 1.5 at least at some direct current (DC) electrical stress between 0.01 kV/mm and 10 kV/mm.

One of said layers of the arrangement of the invention may comprise a polymeric matrial having dispersed therein a particulate filler selected from: compounds having a perovskite-type crystal structure other than titanates of strontium, magnesium, nickel and barium; compounds having a spinel crystal structure selected from compounds of the general formula $A^{II}B^{III}_2O_4$ wherein A is Mg,Co,Cu,Zn or Cd and B is Al,Cr,Fe,Mn,Co or V, provided that when A is Mg, B is not Al, when A is Cu, B is not Cr and when A is Zn, B is not Fe, and compounds of the general formula $A^{IV}B^{II}_2O_4$ wherein A is Ti or Sn and B is Zn,Co,Ni, Mn, Cr or Cd; compounds having an inverse spinal structure, other than stoichiometric $Fe_3O_4$ but including non-stoichiometric variants thereof; compounds having a mixed spinel crystal structure; $MoSe_2$, $MoTe_2$, $MnO_2$ and $SnO_2$; AgI, Prussian blue, Rochelle salt and other alkali metal tartrates, ammonium fluoroberyllate, thiourea, triglycine sulphate ($CH_2NH_2\ COOH)_3H_2SO_4$), ammonium sulphate and compounds of the general formula $XH_2YO_4$ wherein X is K,Rb or Cs and Y is P or As;$Si_3N_4$; a mixture of $Mos_2$ and non-stoichiometric or stoichiometric $Fe_3O_4$; a mixture of stoichiometric or non-stoichiometric $Fe_3O_4$ and barium titanate; a mixture of stoichiometric or non-stoichiometric $Fe_3O_4$ and at least one metallic powder selected from Fe,Al,Cu,Mn, Cr,Pb,Ni,Zn and Ag; and a mixture of barium titanate and a carbon black; the total weight of the compound(s) in the fillee being at least 10% based on the weight of the polymeric material and the material having a $\gamma$-value of at least 1.5 at least at some direct current (DC) electrical stress between 0.01 kV/mm and 10 kV/mm.

The invention also provides a high voltage cable joint or termination having applied thereto an electrical stress limiting arrangement as aforesaid.

Termination of a 20 kV single core plastic insulated cable, with stress control provided by an arrangement in accordance with the present invention, will now be described, by way of example, with reference to the accompanying sectional drawing.

BRIEF DESCRIPTION OF THE DRAWING

The drawing is a longitudinal cross-sectional view of a cable termination in which electrical stress control is provided by an arrangement in accordance with the present invention.

DETAILED DESCRIPTION OF THE DRAWING

Referring to the drawing, the cable is stripped for terminating in the conventional manner. Thus, the cable jacket or oversheath 2 is cut back by a predetermined amount. The exposed screen portion consisting of wires 4 that provide the metal shield of the cable are bent back over the jacket 2 and formed into a pigtail for convenient earthing. The remaining screen portions consisting of a conductive tape layer 6 of paper or fabric impregnated with carbon black and graphite or conductive paint 8 are also exposed. The plastic cable insulation 10 is removed to expose a predetermined length of the end of the cable conductor 12, and an appropriate connector 14 is crimped thereonto.

A first layer of stress controlling material is provided by a heat-shrinkable tube 16 that is slid onto the cable. The tube 16 is positioned at the end of the cable jacket 2 and around the screen portions 6 and 8 and along an adjacent portion of the cable insulation 10, to cover approximately half the exposed length of the insulation 10. The tube 16 may comprise tubing sold by Raychem under its Trade Name SCTM. The tube 16 is then heated to shrink in into position on the cable. A second layer of stress controlling material is provided by a coating 18 that is applied to the inner surface of a heat shrinkable tube 20 of electrically insulating polymeric material. The tube 20 may comprise tubing sold by Raychem under its Trade Name BHVT.

The coating 18 extends only partway along the tube 20, which is positioned so that at one end the coating 18 overlaps the wire screen portion 4 and at the other end the coating 18 stops before the end of the first layer 16. The tube 20 is long enough so that when shrunk onto the cable it extends from the cable jacket 2 to the crimp connector 14.

The first layer 16 has a linear a.c. electrical impedance characteristic, and comprises an insulating polymeric material having carbon black therein such that its specific impedance is about $5 \times 10^8$ ohm-cm. The second layer 18 has a non-linear a.c. electrical impedance characteristic with a $\gamma$ value of about 5.0, and has a specific impedance at 1 kV/cm of bout $2 \times 10^8$ ohm-cm and at 10 kV/cm of about $4 \times 10^7$ ohm-cm.

The non-linear material 18 extends from the end of the screen portion 8 of the cable along the length of the exposed insulation 10 towards the connector 14 for a distance x that is at least 20 mm, and the length y of the linear material 16 that is left uncovered by the non-linear material 18 is at least 20 mm. The linear material 16 may extend up to the end of the insulation 10, and even on to the connector 14 if desired. It will be appreciated that for a given cable these parameters define the minimum and maximum lengths of the non-linear material 18, and will be chosen in dependence on the voltage class of the cable. Also indicated in the drawing is the length 1 for which the cable screen 6,8 is cut back along the insulation 10.

For a 20 kV cable of the construction shown in the drawing, the distance from the end of the cable jacket to the end of the insulation would typically be about 270 mm for an indoor cable, but with the stress-control arrangement of the present invention, this may be reduced, for example to 210 mm or even 160 mm, with no loss of performance of the termination.

The cable discussed with reference to the drawing is a 150 mm² VPE 20 kV cable, and AC discharge and impulse tests were carried out on five samples each having in position the termination described above. The results are given in the following table:

| Sample No. | Dimensions | | | Partial Discharge Measurement | | Impulse Voltage Withstand [kV] |
|---|---|---|---|---|---|---|
| | 1 [mm] | x [mm] | y [mm] | Test Voltage [kV] | Discharge Magnitude [pC] | |
| 1 | 170 | 120 | 30 | (55 (40 | (5 (<0.5 | 155 |
| 2 | 170 | 120 | 30 | 55 | <0.5 | 170 |
| 3 | 170 | 80 | 50 | 55 | <0.5 | 140 |
| 4 | 130 | 65 | 30 | 55 | <0.5 | 145 |
| 5 | 130 | 70 | 30 | 55 | <0.5 | 145 |

Thus, for each sample prepared, its AC behaviour was tested by applying AC voltages of different, decreasing values to the termination and measuring the consequent discharge value. The extinction voltage (DEV) at which no discharge could be detected was also noted. The impulse behaviour was tested by applying increasing impulse voltages to the termination, of positive polarity and of negative polarity, and noting the voltage at which flashover occurred. The values quoted are the average of ten impulses of positive polarity and ten impulses of negative polarity. Typical requirements for the above-mentioned cable are that the discharge at 24 kV should not exceed 20 pC, at 15 kV should not exceed 3 pC, and that flashover should not occur below 125 kV. It will be noted that each of the samples exceeds each of these requirements by an appreciable margin.

The stress control provided in accordance with the present invention, therefore, not only ensures that the necessary standards are met for high voltage electrical equipment, but can be so met in a particularly convenient way. With reference to a cable termination, for example, this can be of very compact configuration, by allowing a shorter cut-back length of the insulation to be used and also by keeping the diameter of the termination substantially the same as that of the cable, since sheds may be dispensed with.

We claim:
1. A high voltage cable comprising a conductor, electrical insulation enclosing said conductor, screening means enclosing said insulation, and grounding means enclosing said, screening means, in which
    (a) said screening means extends beyond said grounding means, said insulation extends beyond said screening means, and said conductor extends beyond said insulation, thereby to effect jointing or termination of said cable;
    (b) two layers of electrically semiconductive material having different a.c. electrical impedance characteristics from each other overlap each other and enclose at least part of said insulation of the cable; and (c) at least the outer of said two layers has a nonlinear impedance characteristic and does not form a continuous electrical path between said conductor and said grounding means of the cable.

2. A cable according to claim 1, wherein said layers are integral with each other.

3. A cable according to claim 1, wherein one of the layers is provided as a tubular member and the other layer is provided on the inside of said tubular member.

4. A cable according to claim 3, wherein the tubular member is recoverable.

5. A cable according to claim 1, wherein one of said layers is provided as a tubular member and the other layer is provided as a coating on the inside of another tubular member.

6. A cable according to claim 5, wherein said another tubular member comprises electrically insulating material.

7. A cable according to claim 6, wherein at least one of the tubular members is recoverable.

8. A cable according to claim 1, wherein each of said layers comprises a tubular member.

9. A cable according to claim 8, wherein at least one of said tubular members is recoverable.

10. A cable according to claim 1, wherein one of said semi-conducting layers comprises an electrically insulating polymeric material that contains carbon black.

11. A cable according to claim 1, wherein one of said semi-conducting layers comprises iron oxide; or zinc oxide; or silicon carbide; or a polymeric material having dispersed therein at least one particulate filler selected from: compounds having a perovskite-type crystal structure; compounds having a spinel crystal structure, other than $\gamma\text{-}Fe_2O_3$ and a spinel itself; compounds having an inverse spinel crystal structure; compounds having a mixed spinel crystal structure; dichalcogenides of transition metals and of tin; AgI, Prussian blue, Rochelle salt and other alkali metal tartrates, compounds of the formula $HX_2YO_4$, wherein X is K, Rb or Cs and Y is P or As, ammonium fluoroberyllate, thiourea, ammonium sulphate and triglycine sulphate; $Si_3N_4$; the total weight of said compound(s) being at least 10% based on the weight of the polymeric material and the material having a $\gamma$-value of at least 1.5 at least at some direct current (DC) electrical stress between 0.01 kV/mm and 10 kV/mm.

12. A cable according to claim 1, wherein one of said semi-conducting layers comprises a polymeric material having dispersed therein a particulate filler selected from: compounds having a perovskite-type crystal structure other than titanates of strontium, magnesium, nickel and barium; compounds having a spinel crystal structure selected from compounds of the general formula $A^{II}B^{III}{}_2O_4$ wherein A is Mg,Co,Cu,Zn or Cd and B is Al,Cr,Fe,Mn,Co or V, provided that when A is Mg, B is not Al, when A is Cu, B is not Cr and when A is Zn, B is not Fe, and compounds of the general formula $A^{IV}B_2{}^{II}O_4$ wherein A is Ti or Sn and B is Zn,Co,- Ni,Mn,Cr or Cd; compounds having an inverse spinel structure, other than stoichiometric $Fe_3O_4$ but including non-stoichiometric variants thereof; compounds having a mixed spinel crystal structure; $MoSe_2$, $MoTe_2$, $MnO_2$ and $SnO_2$; AgI, Prussian blue, Rochelle salt and other alkali metal tartrates, ammonium fluoroberyllate, thiourea, triglycine sulphate ($CH_2NH_2$ $COOH)_3H_2SO_4$), ammonium sulphate and compounds of the general formula $XH_2YO_4$ wherein X is K, Rb or Cs and Y is P or As; $Si_3N_4$; a mixture of $MoS_2$ and non-stoichiometric or stoichiometric $Fe_3O_4$; a mixture of stoichiometric or non-stoichiometric $Fe_3O_4$ and barium titante; a mixture of stoichiometric or non-stoichiometric $Fe_3O_4$ and at least one metallic powder selected from Fe,Al,- Cu,Mn,Cr,Pb,Ni,Zn and Ag; and a mixture of barium titanate and a carbon black; the total weight of the compound(s) in the filler being at least 10% based on the weight of the polymeric material and the material having a $\gamma$-value of at least 1.5 at least at some direct current (DC) electrical stress between 0.01 kV/mm and 10 kV/mm.

13. A cable according to claim 1 wherein the inner of said layers has a linear electrical impedance characteristic, wherein said inner layer is electrically connected to said screening means of the cable and extends therefrom along said insulation towards the end of said insulation and wherein the outer of said layers is electrically connected to said screening means and extends therefrom, overlapping said inner layer towards said one end of the insulation for a shorter distance than said inner layer.

14. A cable as claimed in claim 1, in which the inner one of said layers has a linear impedance characteristic; and in which said inner layer extends in contact with said grounding means and along at least part of said insulation, and said outer layer overlaps a part only of said inner layer.

15. A method of limiting the electrical stress associated with a high voltage cable joint or termination, said cable comprising a conductor, electrical insulation enclosing said conductor, screening means enclosing said insulation, and grounding means enclosing said screening means, in which said screening means extends beyond said grounding means, said insulation extends beyond said screening means and said conductor extends beyond said insulation, thereby to effect jointing or termination of said cable; said method comprising enclosing at least part of said insulation of said cable with two layers of electrically semiconductive material by (a) applying an inner layer of a first electrically semiconductive material; and (b) applying an outer layer of a second electrically semiconductive material having an a.c. electrical impedance characteristic which is non-linear and which is different from that of said first material, said outer layer being applied so that it overlaps at least part of said inner layer and does not form a continuous electrical path between said conductor and said screening means of the cable.

16. A method according to claim 15, wherein the step of applying said inner layer comprises positioning a recoverable tubular article over said grounding means and at least part of said insulation and recovering said article.

17. A method according to claim 15 wherein the step of applying said outer layer comprises positioning a recoverable tubular article over said cable so as to overlap said inner layer and recovering said article.

18. A terminated high voltage cable comprising a conductor, electrical cable insulation enclosing said conductor, screening means enclosing said cable insulation, grounding means enclosing said screening means in electrical contact therewith, an outer insulating cable jacket, inner and outer layers of electrically semiconductive material and a layer of electrically insulating material, in which at one end of the cable;

(a) said cable screening means extends beyond said grounding means, said cable insulation extends beyond said screening means and said conductor extends beyond said cable insulation;
(b) said inner layer of electrically semiconductive material has a linear a.c. electrical impedance characteristic and extends in electrical contact with said screening means and along at least part of said cable insulation;
(c) said outer layer of electrically semiconductive material has a non-linear a.c. electrical impedance characteristic and extends in electrical contact with said screening means and along part only of said inner semiconductive layer towards said conductor; and
(d) said layer of electrically insulating material extends over said screening means and said grounding means and onto said cable jacket, over said inner and outer semiconductive layers, and at least up to the end of said cable insulation.

19. A terminated cable as claimed in claim 18, in which said inner semiconductive layer and said layer of insulating material are recovered tubular members.

20. A terminated cable as claimed in claim 19, in which said outer semiconductive layer is a coating inside said insulating tubular member.

* * * * *